United States Patent

Franz et al.

[11] Patent Number: 6,101,832
[45] Date of Patent: Aug. 15, 2000

[54] METHOD AND PLANT FOR GENERATING COLD AND/OR HEAT

[75] Inventors: Alexander-Ivo Franz, Mühlheim; Manfred Förster, Essen; Antun Gelesic, Neuss, all of Germany

[73] Assignee: EES-Erdgas EnergieSysteme, Essen, Germany

[21] Appl. No.: 09/236,118

[22] Filed: Jan. 22, 1999

Related U.S. Application Data

[63] Continuation of application No. PCT/EP98/02792, May 13, 1998.

[30] Foreign Application Priority Data

May 22, 1997 [DE] Germany .......................... 197 21 351

[51] Int. Cl.[7] .................................................. F25B 27/00
[52] U.S. Cl. ............................ 62/324.2; 62/483; 62/497; 62/105
[58] Field of Search .................. 62/324.2, 483, 62/497, 105

[56] References Cited

U.S. PATENT DOCUMENTS

| | | |
|---|---|---|
| 4,593,531 | 6/1986 | Fujimoto .................................. 62/101 |
| 4,594,856 | 6/1986 | Rothmeyer ............................... 62/112 |
| 4,955,931 | 9/1990 | Mucic ..................................... 62/238.3 |
| 5,177,979 | 1/1993 | Gianfrancesco ......................... 62/335 |
| 5,216,891 | 6/1993 | Ryan ....................................... 62/101 |
| 5,517,830 | 5/1996 | Ohuchi et al. ........................... 62/476 |
| 5,802,866 | 9/1998 | Ishiguro .................................. 62/324.3 |
| 5,901,567 | 5/1999 | Suzuki et al. ........................... 62/324.2 |

*Primary Examiner*—Henry Bennett
*Assistant Examiner*—Mark Shulman
*Attorney, Agent, or Firm*—Herbert L. Lerner; Laurence A. Greenberg; Werner H. Stemer

[57] ABSTRACT

The plant has a generator for a refrigerant in rich solution. A condenser is connected downstream of the generator in the refrigerant loop. A first expansion valve is connected downstream of the condenser. The refrigerant vapor produced there is directed into the sump of an absorber. The liquid refrigerant passes from the first expansion valve to a second expansion valve which adjoins an evaporator. Arranged in the absorber is a jet apparatus, whose nozzle is fed with the weak solution from the generator and whose suction space is connected to the evaporator. The weak solution therefore draws the refrigerant vapor out of the evaporator and delivers it into the top region of the absorber. There, a deflection takes place, whereupon the solution that is increasing in concentration is directed over cooling coils and passes into the sump of the absorber. In this way, very effective droplet, film, trickling and immersion absorption occurs.

18 Claims, 1 Drawing Sheet

METHOD AND PLANT FOR GENERATING COLD AND/OR HEAT

CROSS-REFERENCE TO RELATED APPLICATION

This is a continuation of copending International Application PCT/EP98/02792, filed May 13, 1998, which designated the United States.

BACKGROUND OF THE INVENTION

Field of the Invention

The invention lies in the field of applied thermodynamics. Specifically, the invention relates to a method of generating cold and/or heat, wherein:

- a rich solution consisting of a carrier and a refrigerant is separated by adding heat into a weak solution and a hot vaporous refrigerant;
- the hot vaporous refrigerant is liquefied while heat is given off;
- the liquid refrigerant expands and, while heat is absorbed, is evaporated to form cold vaporous refrigerant;
- the cold vaporous refrigerant is drawn in by the weak solution and, while heat is given off, is absorbed in this weak solution to form the rich solution; and
- the rich solution is pressurized before its separation.

The invention also relates to a sorption plant for generating cold and/or heat, which comprises:

- a heated generator;
- a refrigerant condenser connected downstream of the generator;
- at least one expansion valve connected downstream of the condenser;
- a refrigerant evaporator connected to the expansion valve; and
- an absorber, which contains at least one cooling coil through which a cooling medium flows, and a jet apparatus, whose nozzle is connected to the generator via a line for weak solution and whose suction space is connected to the evaporator, the absorber being connected to the generator via a line for rich solution with a pump connected in between.

The degree of absorption is a very important parameter in the process and it defines the efficiency of the process and of the plant.

SUMMARY OF THE INVENTION

It is accordingly an object of the invention to provide a process and apparatus for generating heat and/or cold, which overcomes the above-mentioned disadvantages of the heretofore-known devices and methods of this general type and in which the degree of absorption is further improved in the process.

With the foregoing and other objects in view there is provided, in accordance with the invention, a thermodynamic method, which comprises:

- separating a rich solution consisting of a carrier and a refrigerant by adding heat into a weak solution and a hot vaporous refrigerant;
- liquefying the hot vaporous refrigerant while giving off heat;
- expanding the liquid refrigerant and, while absorbing heat, evaporating the refrigerant to form cold vaporous refrigerant;
- drawing the cold vaporous refrigerant into the weak solution and, while giving off heat, absorbing the refrigerant into the weak solution to form the rich solution;
- passing the cold vaporous refrigerant and the weak solution pass through stages of droplet absorption, film absorption, and trickling absorption; and
- pressurizing the rich solution prior to separating the rich solution.

In other words, the invention is distinguished in that the cold vaporous refrigerant and the weak solution pass through the stages of droplet, film and trickling absorption. The combination of these absorption stages offers the possibility of optimizing the degree of absorption.

In this case, an important development of the method according to the invention consists in the fact that the weak solution is sprayed out as a droplet jet directed from the bottom upward and entrains the cold vaporous refrigerant in the process, that the droplet vapor jet is deflected and made to trickle down over cooling areas, and that a solution increasing in concentration is collected in the bottom region of the cooling areas.

In the droplet vapor jet, a large contact area is obtained between the weak solution and the vaporous refrigerant, a factor which is just as beneficial to the absorption as the high degree of turbulence achieved at the same time. During the deflection, vigorous swirling and subsequently formation of a film on the cooling areas occur. This results in especially favorable heat transfer conditions.

In the droplet jet, the pressure energy of the weak solution is converted into kinetic energy. This results in the suction effect which acts on the vaporous refrigerant. The kinetic energy is then converted back into pressure energy, so that an increase in the absorption pressure thus occurs. This, too, helps to increase the degree of absorption.

In accordance with an added feature of the invention, the drawing step comprises spraying the weak solution in a droplet jet directed from a bottom upward and entraining the cold vaporous refrigerant in the process, deflecting the droplet vapor jet and causing the droplet vapor to trickle down over cooling areas, and collecting a solution increasing in concentration in a bottom region of a cooling area.

In accordance with an additional feature of the invention, immersion absorption is caused between the cold vaporous refrigerant and the solution increasing in concentration. The same principles as above apply in the immersion absorption between the cold vaporous refrigerant and the solution increasing in concentration. Refrigerant vapor bubbles thus form in the carrier.

In accordance with another feature of the invention, the liquid refrigerant is evaporated in at least two stages to form cold vaporous refrigerant, and cold vaporous refrigerant of an evaporation stage(s) disposed upstream is separated from the liquid refrigerant and injected into the solution increasing in concentration. This portion of the refrigerant vapor is therefore at a higher pressure level than the refrigerant vapor drawn in from the evaporator. It can therefore be injected into the solution increasing in concentration, the solution likewise being under higher pressure. This in turn helps to increase the absorption pressure and thus the degree of absorption.

In accordance with a further feature of the invention, the cold vaporous refrigerant of the evaporation stage disposed upstream is sprayed into the solution increasing in concentration while a vortex flow is generated.

In accordance with again a further feature of the invention, the method also comprises the steps of joining and recirculating a partial flow of the rich solution with the weak solution prior to the separating step. In other words, the spraying of the refrigerant vapor into the solution increasing in concentration is advantageously done in such a way that a vortex flow forms in the solution, and this vortex flow increases the contact time between the vapor bubbles and the solution. The latter is also helped by the fact that the rising vapor bubbles follow a zigzag-shaped path through the solution.

The rich solution produced by the absorption is then heated in a multistage manner, specifically both by the heat produced during the absorption and by hot refrigerant vapor and hot weak solution.

Furthermore, it is advantageous to bring some of the rich solution together with the weak solution and recirculate it before it is separated. The absorption pressure can be regulated during output changes by setting the recirculation quantity.

With the above and other objects in view there is also provided, in accordance with the invention, a sorption plant for generating cold and/or heat, comprising:

a heated generator;

a refrigerant condenser connected downstream of the generator in a refrigerant loop;

an expansion valve connected downstream of the condenser in the refrigerant loop;

a refrigerant evaporator connected to the expansion valve; and an absorber connected in the refrigerant loop, the absorber having a bottom and including at least one cooling coil through which a cooling medium flows, a deflecting wall above the cooling coil, and a jet apparatus having a nozzle communicating with the generator via a line for weak solution and being formed with a suction space communicating with the evaporator;

a line for rich solution and a pump connected in the line for rich solution, the absorber communicating with the generator via the line for rich solution;

wherein the nozzle of the jet apparatus is directed from the bottom upward toward the deflecting wall, and the deflecting wall is directed toward a top end of the cooling coil.

The objects of the invention are thus achieved with the sorption plant in which the nozzle of the jet apparatus is directed from the bottom upward toward the deflecting wall, and the deflecting wall is directed toward the top end of the cooling coil. A droplet jet of weak solution issues from the nozzle, and this droplet jet entrains refrigerant vapor and mixes with the latter. The absorption action already starts here. The droplet vapor jet then strikes the deflecting wall, in the course of which a film, which becomes thinner with increasing distance from the impingement point, forms on the deflecting wall. At the same time, swirling of the droplet vapor flow occurs. The solution then strikes the cooling coil and trickles down on the latter while forming a film. Large contact areas, high turbulence and very good heat transfer conditions distinguish this mode of operation.

In accordance with again an added feature of the invention, a diffuser adjoins the suction space of the jet apparatus, and a concentric baffle arrangement is formed with a passage for a concentric cooling coil disposed at a top end of the diffuser. The diffuser helps to convert the dynamic pressure produced in the jet apparatus back into static pressure and thereby helps to increase the absorption pressure. In addition, a space which is essentially free of carrier droplets is obtained outside the diffuser. This is because the carrier droplets are delivered by the deflecting wall to the baffle arrangement and are deflected by the latter at the top onto the cooling coil. The heat transfer is therefore not reduced by spurting droplets.

If a plurality of concentric cooling coils are provided, the baffle arrangement has a corresponding number of concentric passages.

In accordance with again an additional feature of the invention, the suction space of the jet apparatus is formed with at least one additional suction opening communicating with a space outside the diffuser. In a preferred embodiment, the additional suction opening has an adjustable opening size.

the jet apparatus therefore draws back that refrigerant vapor into the droplet flow which is located in the space of the cooling coil. In this case, the additional suction opening is preferably adjustable in its size.

In accordance with again another feature of the invention, the deflecting wall is a rotationally symmetrical cap having a central point directed downward toward the nozzle and produces a toroidal vortex of high intensity. In this case, it is also proposed to cool the deflecting wall.

In accordance with yet an added feature of the invention, a throttling valve and a separating device are connected upstream of the expansion valve in the refrigerant loop, the separating device being formed with an outlet for a liquid phase connected to the expansion valve, and an outlet for a vaporous phase connected to the bottom of the absorber. Thus vaporous refrigerant under a pressure which is above that of the evaporator is directed into the already enriched solution at the base of the absorber. Forming here are vapor bubbles, which lead to intensive immersion absorption.

In accordance with yet an additional feature of the invention, an intense vortex flow can be generated where the outlet for the vaporous phase of the separating device leads tangentially into the bottom of the absorber. This increases the contact times between the vapor bubbles and the solution.

In accordance with yet another feature of the invention, a plurality of plates are disposed in the bottom region of the absorber, the plates being arranged one above the other and alternately defining an inner and an outer passage opening.

In accordance with yet a further feature of the invention, the cooling coil is at least partly integrated in the line for the rich solution.

As mentioned, the cooling coil serves to draw off the heat of condensation and the solution heat. This heat may be given off completely to external heat consumers. On the other hand, it is advantageous to integrate the cooling coil at least partly in the line for the rich solution. The rich solution drawn off at the bottom from the absorber is therefore delivered by the pump through the cooling coil and undergoes initial heating here.

In a preferred embodiment, the deflecting wall forms a bottom closure of a head chamber or header integrated in the line for the rich solution. The rich solution is then directed through the head chamber above the deflecting wall. As a result, the deflecting wall is cooled and the rich solution is subjected to a second heating step. In order to improve the heat transfer, the rich solution is directed tangentially into the head chamber and drawn off centrally.

In accordance with a concomitant feature of the invention, a controllable branch line is connected between the line for the rich solution and the line for the weak solution downstream of the pump. Some of the rich solution is therefore recirculated into the jet apparatus of the absorber, as a result of which the absorption pressure can be regulated during an output change.

Other features which are considered as characteristic for the invention are set forth in the appended claims.

Although the invention is illustrated and described herein as embodied in a method and plant for generating cold and/or heat, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWINGS

The sole FIGURE of the drawing is a block and flow diagram of a sorption plant.

DESCRIPTION OF THE PREFERRED EMBODIMENTS

Figure 1:
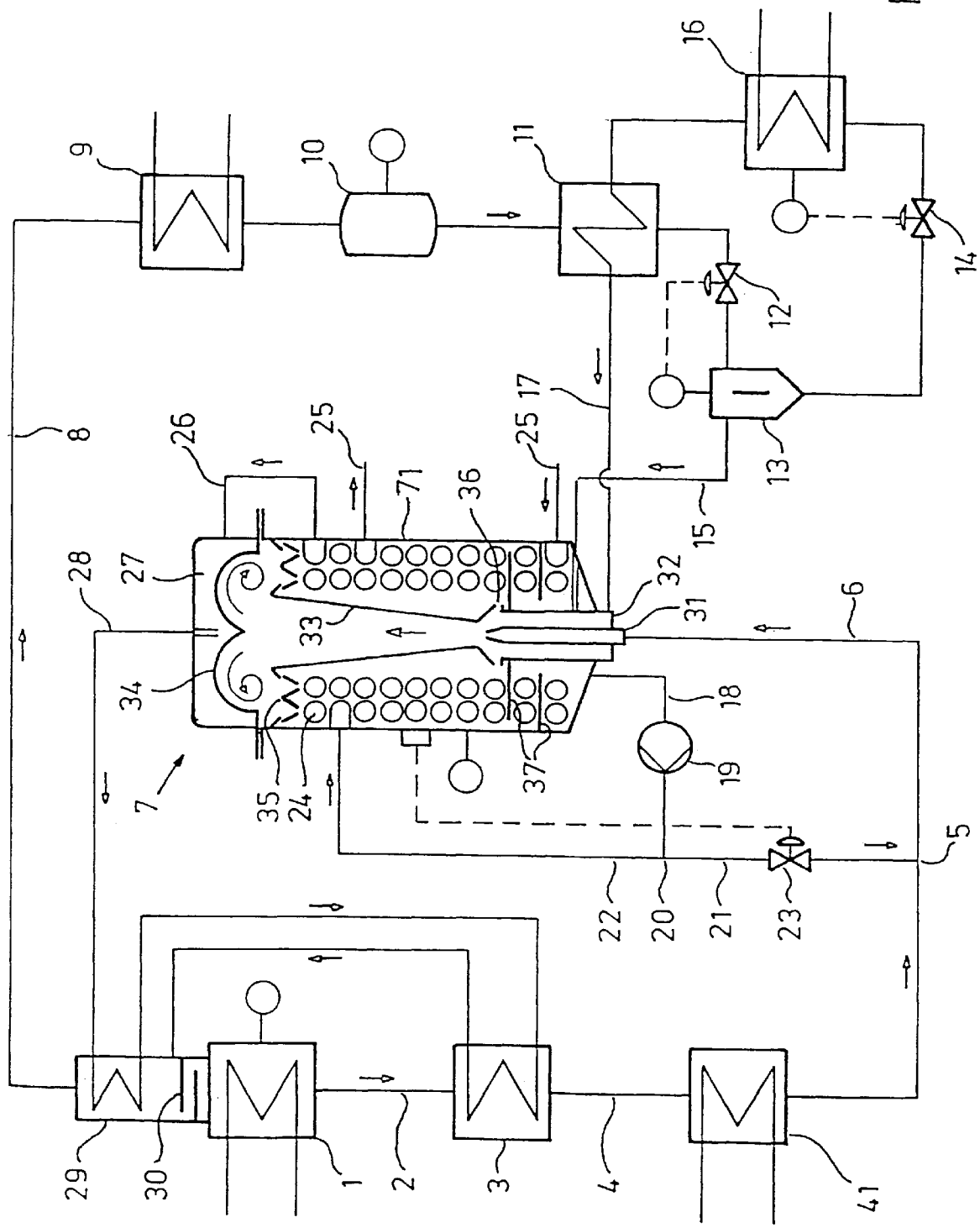

Referring now to the FIGURE of the drawing in detail, it is first noted that the plant shown is suitable in particular for such applications in which heat and low-temperature consumers are to be supplied at the same time. These conditions exist, for example, in slaughterhouses. The sorption plant is preferably combined with a unit-type district heating power station, in which case the energy for operating the sorption plant can be obtained from the waste heat of the power station, for example from the exhaust gas of a gas engine.

The waste heat serves to heat a generator 1, which contains a rich solution. In the exemplary embodiment, the rich solution consists of water as a carrier and ammonia as a refrigerant.

The refrigerant is separated from the carrier in the generator 1 by adding in heat. The carrier leaves the generator 1 as a hot weak solution via a line 2 and passes to a heat exchanger 3, in which the weak solution is cooled. Adjoining the heat exchanger 3 is a line 4, which leads via a further heat exchanger 41 to a mixing point 5. The quantity of the refrigerant vapor absorbed at the absorber inlet can be controlled with the heat exchanger 41. From the mixing point 5, the weak solution passes via a line 6 to an absorber 7.

The refrigerant expelled in the generator 1 is directed as hot refrigerant vapor via a line 8 to a condenser 9. Here, the refrigerant is liquefied while being cooled down at the same time. The released superheating and liquefaction heat may be supplied to a heat consumer. Furthermore, the refrigerant, which is now liquid, may be subcooled in order to increase the overall efficiency of the plant.

Adjoining the condenser 9 is a collector 10, which compensates for volumetric fluctuations in the refrigerant loop, as occur, for example, during output changes.

From the collector 10, the refrigerant passes to an aftercooler 11, in which further subcooling takes place and improves the efficiency of the cyclic process.

The refrigerant is then fed to a throttling valve 12, in which the high liquefaction pressure is reduced to the absorption pressure. In the process, a mixture of liquid and vaporous refrigerant is obtained. A corresponding phase separation is effected in a downstream separating device 13. The liquid phase is fed to an expansion valve 14, while the vaporous phase passes via a line 15 into the absorber 7.

At the expansion valve, the pressure is reduced to the evaporation pressure. The refrigerant then passes into an evaporator 16, in which the evaporation of the refrigerant is effected while heat is accordingly absorbed. The evaporator 16 is connected to a low-temperature consumer, which delivers the evaporation heat. The low-temperature consumer is one that works with deep freezing.

The cold refrigerant vapor is directed via the aftercooler 11, where it absorbs heat from the refrigerant condensate and then passes via a line 17 to the absorber 7.

In the latter, the refrigerant vapor is absorbed by the weak solution while heat is given off, the corresponding rich solution collecting in the bottom region of the absorber.

From here, the rich solution is drawn off via a line 18, specifically by a pump 19. Lying downstream of the pump 19 is a branching point 20, from which lines 21 and 22 branch off. The line 21 contains a control valve 23 and leads to the mixing point 5, where some of the rich solution is admixed with the weak solution and recirculated into the absorber 7.

In this way, pressure changes which result from output changes can be compensated for. The weak solution is cooled down further by the rich solution.

The line 22 leads to a cooling coil 24, which is arranged in the interior of the absorber 7 and serves to feed some of the heat of absorption and subcooling heat produced in the absorber into the rich solution. The rest of this heat is drawn off by a further cooling coil 25, which is indicated here by its inlet and return lines. It serves to supply a heat consumer.

The cooling coil 24 is connected via a line 26 to a head chamber 27 of the absorber 7. Branching off centrally from the head chamber 27 is a line 28, which leads to a dephlegmator 29. Here, the rich solution comes into heat exchange with the hot vaporous refrigerant. In the process, heat is extracted from the refrigerant vapor, a factor which leads to water being condensed out and thus to an increase in the refrigerant concentration.

The rich solution passes from the dephlegmator 29 to the heat exchanger 3, where it is heated again, and finally to a column arranged below the dephlagmator, where it is directed over plates 30 and passed into the generator 1. In the process, condensation of water vapor occurs here too, as does mass transfer, which results in an increase in the refrigerant concentration.

As mentioned, the line 6 serves to feed the cooled-down weak solution, if need be mixed with rich solution, to the absorber 7. Adjoining the line 6 is a nozzle 31, which is directed from the bottom upward in the absorber 7 and leads into a suction chamber 32. The jet of refrigerant droplets which issues from the nozzle produces a vacuum in the suction chamber 32, and this vacuum is below the evaporation pressure of the refrigerant in the evaporator 16. Since the line 17 is connected to the suction chamber 32, the refrigerant vapor superheated in the aftercooler 11 is drawn in an accelerated manner into the absorber and is entrained by the droplet jet of the weak solution and compressed. The first step of the absorption, which is droplet absorption, already starts here. It takes place at high turbulence.

The nozzle 31 converts the potential energy of the weak solution into kinetic energy, the latter being converted back to pressure energy in a diffuser 33 adjoining the suction chamber 32. The absorber pressure therefore lies above the evaporation pressure, as a result of which the degree of absorption is accordingly increased. An increase in contact area also occurs, due to the mass difference and the resulting velocity difference. The weak solution is subcooled and immediately absorbs refrigerant vapor until a saturation temperature is reached.

The droplet vapor jet rising in the diffuser 33 strikes a deflecting wall 34, which forms the lower boundary of the head chamber 27 and is accordingly cooled by the rich solution flowing through the head chamber. The cooling is intensive, especially as the line 26 leads tangentially into the head chamber 27 and produces a rotational flow in the latter. Excellent heat transfer results, which likewise helps to increase the degree of absorption.

The deflecting wall 34 is formed in such a way that a toroidal annular vortex of high turbulence forms, as a result of which the absorption is again promoted. In addition to the droplet absorption, film absorption already occurs here, since the solution is in contact with the deflecting wall 34 as a film with a thickness decreasing toward the outside.

Provided below the outer margin of the deflecting wall 34 is a baffle arrangement 35, which forms a closure between the top margin of the diffuser 33 and the casing 71 of the absorber 7. The baffle arrangement 35 calms the turbulent flow and has slots which direct the dripping solution directly and uniformly onto the top turns of the cooling coils 24 and 25. The solution therefore forms films on the cooling coils and at the same time trickles downward on the latter. In addition to the film absorption, trickling absorption therefore also occurs.

The arrangement overall is made in such a way that all the liquid in the space below the baffle arrangement 35 and outside the diffuser 33 adheres to the cooling coils 24 and 25. Accordingly, very good heat transfer occurs, and this heat transfer is not impaired by spurting droplets. The free space is filled with refrigerant vapor. In order to produce a high degree of turbulence here and to also draw back the refrigerant vapor into the weak solution, the suction chamber 32 has an annular opening 36, the passage cross section of which can be varied by a ring (not illustrated).

As already indicated above, the invention works with two-stage refrigerant-vapor suction, specifically, on the one hand, via the line 17 and the suction chamber 32 under the action of the nozzle 31 and, on the other hand, via the line 15, which directs the vaporous phase coming from the separating device 13. The pressure set by the throttling valve 12 is above the evaporation pressure and also above the pressure in the bottom region of the absorber 7. The refrigerant vapor can therefore be drawn or sprayed from the line 15 into the solution which is disposed in the bottom region of the absorber and is increasing in concentration. This takes place tangentially, so that vigorous swirling of the liquid thus occurs. The refrigerant vapor forms bubbles in the solution, from which intensive immersion absorption under increased pressure results. The bubbles rise in the solution, in the course of which they are forced to migrate back and forth by the plates 37. This is because the bottom plate only has a central opening surrounding the suction chamber 32, whereas the top plate forms an annular gap merely at the casing 71 of the absorber. Despite the low liquid column, very good immersion absorption occurs due to the different flow velocities and directions of the two components and the resulting large contact area.

Since the cooling coils 24 and 25 also extend into the sump of the absorber, the heat of condensation and the solution heat produced are also given off directly to the cooling coils in this region.

The two-stage refrigerant-vapor suction permits absorption at two different evaporation temperatures. Prevailing downstream of the throttling valve 12 is a pressure which is higher than the evaporation pressure downstream of the expansion valve 14. Produced downstream of the latter is a mixture which contains a high proportion of liquid and very little vapor. The vapor/liquid ratio depends on the evaporation pressure, the liquefaction pressure and the subcooling temperature. In particular during deep freezing, most of the vapor, which is produced during the expansion to the evaporation pressure, has already been directed via the separating device 13 into the lowest point of the absorber 7, specifically under increased pressure. The pressure in the absorber is also above the evaporation pressure, in which case the pressure of the liquid column is still to be added. Only a small vapor volume flows as ballast into the evaporator, which results in a high evaporation coefficient and a small evaporator volume. The vapor drawn off from the separating device 13 is absorbed without energy consumption at a pressure which is above the evaporation pressure. This improves the absorption coefficient. That vapor quantity which has to be drawn off from the evaporator 16 by the jet apparatus is reduced precisely by this vapor quantity. The absorber 7 may correspondingly be of smaller dimensions.

Modifications are perfectly possible within the scope of the invention. In the case of the exemplary embodiment, although the generator is heated with the exhaust gas of a gas engine, other heat sources are also conceivable. Furthermore, the FIGURE shows an absorber with two concentric cooling coils. This number can be readily varied, in which case care must always be taken to ensure that the baffle arrangement above the cooling coils has a corresponding number of annular passage openings. The deflecting wall according to the FIGURE is rotationally symmetrical and has a point directed toward the nozzle. In the case of a non-concentric design of the absorber and its built-in components, other configurations are also possible. Furthermore, it is important in connection with the deflecting wall that heat is drawn off from the absorber at this location. In the present case, this heat passes into the rich solution, a factor which is very favorable in terms of energy. Alternatively, work may also be carried out with cooling water, the heat then passing into the environment or to a consumer.

We claim:

1. A thermodynamic method, which comprises:
    separating a rich solution consisting of a carrier and a refrigerant by adding heat into a weak solution and a hot vaporous refrigerant;
    liquefying the hot vaporous refrigerant while giving off heat;
    expanding the liquid refrigerant and, while absorbing heat, evaporating the refrigerant to form cold vaporous refrigerant;
    drawing the cold vaporous refrigerant into the weak solution and, while giving off heat, absorbing the refrigerant into the weak solution to form the rich solution;
    passing the cold vaporous refrigerant and the weak solution pass through stages of droplet absorption, film absorption, and trickling absorption; and
    pressurizing the rich solution prior to separating the rich solution.

2. The method according to claim 1, wherein the drawing step comprises spraying the weak solution in a droplet jet directed from a bottom upward and entraining the cold vaporous refrigerant in the process, deflecting the droplet vapor jet and causing the droplet vapor to trickle down over cooling areas, and collecting a solution increasing in concentration in a bottom region of a cooling area.

3. The method according to claim 1, which comprises causing immersion absorption between the cold vaporous refrigerant and the solution increasing in concentration.

4. The method according to claim 3, which comprises evaporating the liquid refrigerant in at least two stages to form cold vaporous refrigerant, and separating cold vaporous refrigerant of an evaporation stage disposed upstream from the liquid refrigerant and injecting into the solution increasing in concentration.

5. The method according to claim 4, which comprises spraying the cold vaporous refrigerant of the evaporation stage disposed upstream into the solution increasing in concentration while generating a vortex flow.

6. The method according to claim 1, which comprises joining and recirculating a partial flow of the rich solution with the weak solution prior to the separating step.

7. A sorption plant for generating cold and/or heat, comprising:

a heated generator;

a refrigerant condenser connected downstream of said generator in a refrigerant loop;

an expansion valve connected downstream of said condenser in the refrigerant loop;

a refrigerant evaporator connected to said expansion valve; and an absorber connected in the refrigerant loop, said absorber having a bottom and including at least one cooling coil through which a cooling medium flows, a deflecting wall above said cooling coil, and a jet apparatus having a nozzle communicating with said generator via a line for weak solution and being formed with a suction space communicating with said evaporator;

a line for rich solution and a pump connected in said line for rich solution, said absorber communicating with said generator via said line for rich solution;

wherein said nozzle of said jet apparatus is directed from said bottom upward toward said deflecting wall, and said deflecting wall is directed toward a top end of said cooling coil.

8. The sorption plant according to claim 7, which further comprises a diffuser adjoining said suction space of said jet apparatus, and a concentric baffle arrangement formed with a passage for a concentric cooling coil disposed at a top end of said diffuser.

9. The sorption plant according to claim 8, wherein said suction space of said jet apparatus is formed with at least one additional suction opening communicating with a space outside said diffuser.

10. The sorption plant according to claim 9, wherein said additional suction opening has an adjustable opening size.

11. The sorption plant according to claim 7, wherein said deflecting wall is a rotationally symmetrical cap having a central point directed downward toward said nozzle.

12. The sorption plant according to claim 7, which further comprises a throttling valve and a separating device connected upstream of said expansion valve in the refrigerant loop, said separating device being formed with an outlet for a liquid phase connected to said expansion valve, and an outlet for a vaporous phase connected to said bottom of said absorber.

13. The sorption plant according to claim 12, wherein said outlet for the vaporous phase of said separating device leads tangentially into said bottom of said absorber.

14. The sorption plant according to claim 12, which further comprises a plurality of plates disposed in said bottom of said absorber, said plates being arranged one above the other and alternately defining an inner and an outer passage opening.

15. The sorption plant according to claim 7, wherein said cooling coil is at least partly integrated in said line for the rich solution.

16. The sorption plant according to claim 7, wherein said deflecting wall forms a bottom closure of a head chamber integrated in said line for the rich solution.

17. The sorption plant according to claim 16, wherein said line for the rich solution leads tangentially into said head chamber.

18. The sorption plant according to claim 7, which further comprises a controllable branch line connecting said line for the rich solution to said line for the weak solution downstream of said pump.

* * * * *